United States Patent

Noda

[11] Patent Number: 5,001,318
[45] Date of Patent: Mar. 19, 1991

[54] HIGH FREQUENCY HEATING APPARATUS WITH ABNORMAL CONDITION DETECTION

[75] Inventor: Tomimitsu Noda, Gifu, Japan

[73] Assignee: Kabushiki Kaisha Toshiba, Kanagawa, Japan

[21] Appl. No.: 550,963

[22] Filed: Jul. 11, 1990

[30] Foreign Application Priority Data

Aug. 9, 1989 [JP] Japan ................... 1-206230

[51] Int. Cl.⁵ ............................................... H05B 6/68
[52] U.S. Cl. ............................. 219/10.55 B; 363/97; 363/56; 323/356; 361/88
[58] Field of Search ............ 219/10.55 B, 10.55 R, 219/10.55 E; 363/97, 56, 21, 131; 323/356, 357; 361/88

[56] References Cited

U.S. PATENT DOCUMENTS

| | | | |
|---|---|---|---|
| 3,667,027 | 5/1972 | Martin | 363/56 |
| 4,156,273 | 5/1979 | Sato | 363/56 |
| 4,866,590 | 9/1989 | Odaka et al. | 219/10.55 B |
| 4,903,183 | 2/1990 | Noguchi et al. | 219/10.55 B |

FOREIGN PATENT DOCUMENTS 52-79342  4/1977  Japan.

*Primary Examiner*—Philip H. Leung
*Attorney, Agent, or Firm*—Philip M. Shaw, Jr.

[57] ABSTRACT

A microwave oven includes a step-up transformer having primary and secondary windings, an inverter inducing a high frequency oscillating current at the primary winding of the transformer by an on-off operation of a switching element, a magnetron to which a DC voltage is applied by the transformer, a current transformer detecting an input current to the inverter, a control circuit for controlling "on" and "off" periods of the switching element so that a magnetron anode current is controlled, and a detecting winding arranged in the transformer so as to be magnetically connected to the primary winding. The detecting winding detects an induced voltage which indicates either a short-circuit or open-circuit in the secondary circuit of the transformer. The control circuit detects an abnormal condition of the secondary circuit of the transformer based on the induced voltage detected by the detecting winding. Upon detection of the abnormal condition, the control circuit operates to interrupt the operation of the switching element.

3 Claims, 2 Drawing Sheets

TURN OF THE WINDING WHERE A SHORT-CIRCUIT
HAS TAKEN PLACE (ORDINAL)

HIGH FREQUENCY HEATING APPARATUS WITH ABNORMAL CONDITION DETECTION

BACKGROUND OF THE INVENTION

This invention relates to high frequency heating apparatus such as microwave ovens wherein DC power obtained by rectifying, by use of a rectification circuit, a high frequency voltage delivered from an inverter circuit and stepped up by a transformer, thereby driving a magnetron, and more particularly to such a high frequency heating apparatus provided with means for detecting an abnormal condition of an electric circuit for applying voltage to the anode of the magnetron.

A conventional high frequency heating apparatus of the above-described type comprises rectification means for converting a commercial AC power voltage to a DC voltage and inverter means including a switching element and a transformer which also serves as inductance coil means. The DC voltage from the rectification means is applied to the transformer through the switching element turned on and off so that a high frequency voltage is obtained at the inverter means. The high frequency heating apparatus further comprises a magnetron connected to a high frequency rectifying circuit. The high frequency rectifying circuit rectifies the AC voltage from the secondary winding of the transformer to thereby obtain a DC voltage which is applied to the magnetron. A control circuit is provided for controlling "on" and "off" periods of the switching element so that a magnetron anode current is maintained at a predetermined value. The inverter means is provided for the purpose of reducing the size of the transformer employed to obtain the high voltage which is applied to the magnetron.

In accordance with the above-described high frequency heating apparatus, the magnetron is oscillated upon application of the DC voltage thereto. As a result, microwave energy is generated by the magnetron and radiated to foodstuffs to be heat cooked. When the magnetron is continuously driven, a permanent magnet of the magnetron is heated as the result of generation of heat by the magnetron. Consequently, an amount of magnetic flux induced is reduced with the increase in the temperature of the permanent magnet. An amount of anode current of the magnetron is increased with the temperature increase of the permanent magnet and accordingly, an amount of microwave energy generated is also increased therewith. In order to prevent the amount of the magnetron anode current from being uselessly increased, a current transformer is conventionally provided across a primary winding input line of the transformer for detecting a transformer input current and current control means is provided for controlling the switching element of the inverter means in response to a current detection signal from the current transformer so that the magnetron anode current is maintained at a predetermined value.

On the other hand, it has been desired that measures be taken against an abnormal condition such as a burnout in a transformer secondary circuit or the circuit for applying voltage to the magnetron anode. Although one of the measures is to detect the input current to a primary winding of the transformer to thereby detect the abnormal condition, it is impossible to do so for the reason that the above-mentioned current control means for controlling the magnetron anode current is operated so that the increase and decrease in the primary current is restrained.

SUMMARY OF THE INVENTION

Therefore, an object of the present invention is to provide a high frequency heating apparatus wherein an abnormal condition of the transformer secondary circuit such as burnout or open-circuit can be detected with certainty without detection of the transformer input current for the purpose of applying voltage to the magnetron anode and the operation of a magnetron drive circuit can be interrupted upon detection of such an abnormal condition.

In order to achieve the above-described and other objects, the present invention provides a high frequency heating apparatus comprising a transformer having primary and secondary windings, inverter means comprising an oscillation circuit electrically connected to the primary winding of the transformer and a switching element controlled so as to be turned on and off so that a DC current is intermittently fed to the oscillation circuit for the purpose of inducing a high frequency voltage in the primary winding, a magnetron connected to a high frequency rectifying circuit rectifying an AC voltage from the secondary winding of the transformer to a DC voltage, which DC voltage is applied to the magnetron, a control circuit for controlling "on" and "off" periods of the switching element so that a magnetron anode current is controlled, a detecting winding provided in the transformer so as to be magnetically connected to the primary winding, thereby detecting an induced voltage the value of which indicates either a short-circuit or open-circuit in the secondary circuit, abnormal condition detecting means for detecting an abnormal condition of the secondary circuit of the transformer based on the voltage induced by the detecting winding, and interruption means for interrupting the operation of the switching element when the abnormal condition of the secondary circuit of the transformer is detected by the abnormal condition detecting means.

It is preferable that alarm means be provided for alarming when the abnormal condition of the secondary circuit of the transformer is detected by the abnormal condition detecting means.

Furthermore, it is preferable that the detecting winding be disposed between the primary and secondary windings of the transformer and grounded.

A transformer core in the above-described apparatus is much influenced by a secondary flux induced by the secondary winding current. The detecting winding is disposed so as to be magnetically coupled to the primary winding through the above-mentioned core. When the secondary circuit is in an abnormal condition such as short-circuit or open-circuit, the secondary winding current fluctuates correspondingly, which changes an amount of a leakage flux. Consequently, the voltage induced by the detecting winding is changed.

Based on the output voltage produced by the detecting winding, the abnormal condition detecting means detects the abnormal condition of the secondary winding circuit. As a result, the on-off operation of the switching element is interrupted and an alarming operation takes place.

Other objects of the invention will become obvious upon understanding of an illustrative embodiment about to be described or will be indicated in the appended claims. Various advantages not referred to herein will occur to one skilled in the art upon employment of the invention in practice.

DESCRIPTION OF THE PREFERRED EMBODIMENT

An embodiment of the present invention will now be described with reference to the accompanying drawings.

Figure 1:
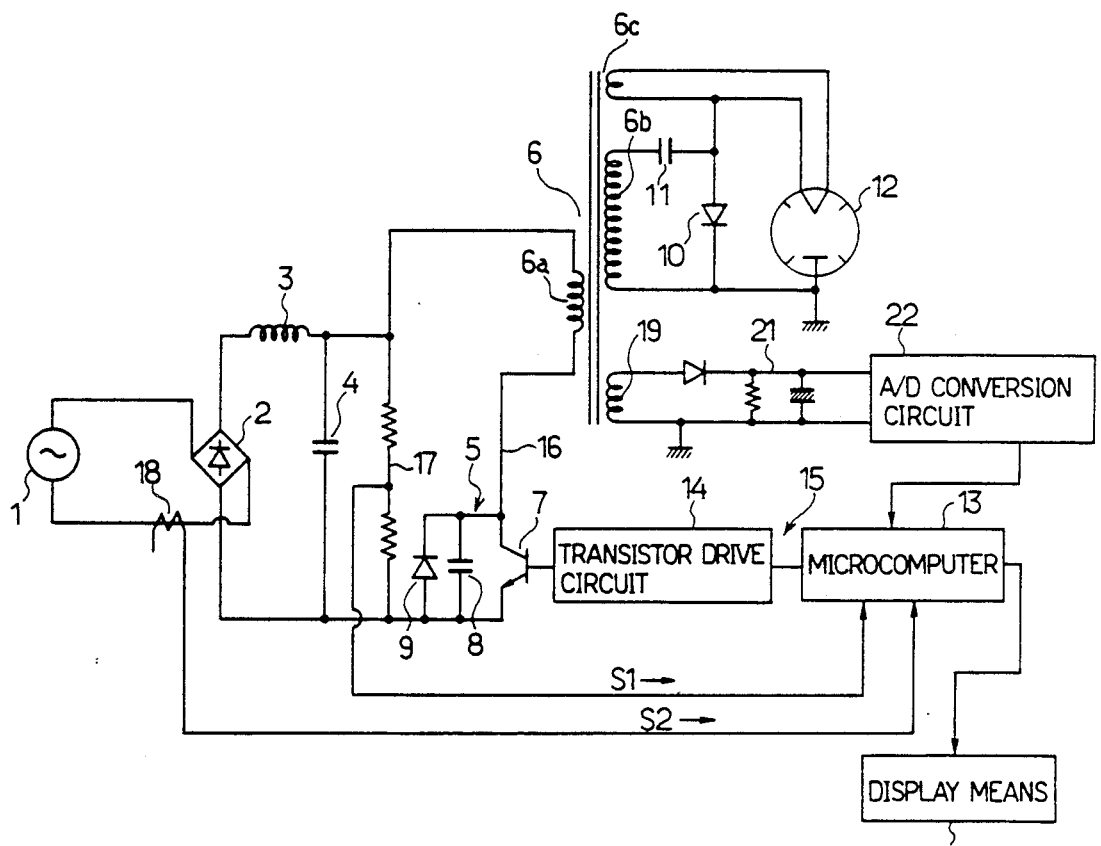
FIG. 1 is a connection diagram of magnetron drive circuitry employed in a high frequency heating apparatus of an embodiment of the invention.

Referring first to FIG. 1, an AC voltage from a commercial AC power source 1 is rectified by a bridge-connected diode 2 as a rectification circuit and smoothed by a choke coil 3 and smoothing capacitor 4, thereby obtaining a DC voltage. The DC voltage is converted by an inverter circuit 5 to a high frequency voltage which is at a frequency of approximately 30 KHz. The inverter circuit 5 comprises a primary winding 6a of a step-up transformer 6 also serving as an inductance coil, a switching transistor 7 as a switching element, a resonance capacitor 8 and a diode 9. An output from a secondary winding 6b of the transformer 6 is half-wave rectified by high frequency rectification means or rectifying diode 10 and capacitor 11 and then, supplied to a magnetron 12.

A tertiary winding 6c of the transformer 6 is employed for energizing a heater of the magnetron 12. Microwave energy generated by the magnetron 12 is propagated into a cooking chamber of the high frequency heating apparatus to thereby heat foodstuffs placed therein.

Figure 2:
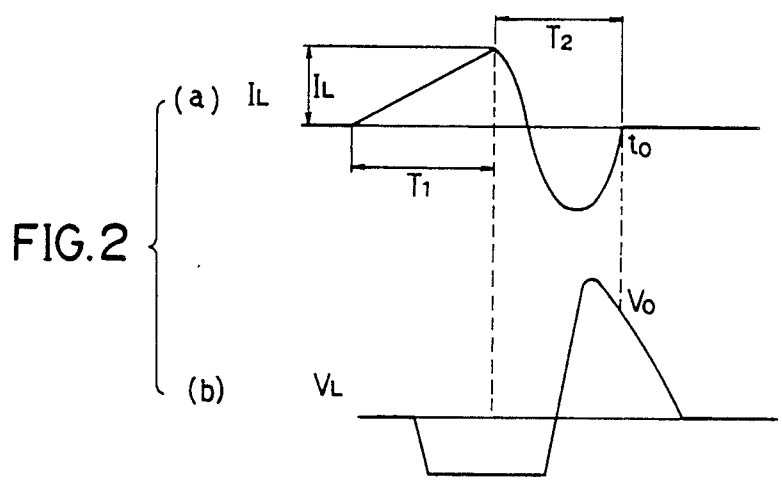
FIGS. 2(a) and 2(b) are waveform charts showing primary current and voltage of a step-up transformer which also serves as an inductance coil of an inverter circuit, respectively.

The switching transistor 7 of the inverter circuit 5 is on-off controlled by a control circuit 15 comprising a microcomputer 13 and a transistor drive circuit 14. For attainment of the on-off control of the switching transistor 7, a voltage dividing resistor circuit 17 is connected in parallel to an oscillation circuit 16 comprising a series circuit of the primary winding 6a and resonance capacitor 8. When the switching transistor 7 in the inverter circuit 5 is on-off controlled, an oscillating current $I_L$ and oscillating voltage $V_L$ are produced at an oscillation circuit 16, as is respectively shown in FIGS. 2(a) and 2(b) in which reference symbol T1 designates an "on" period of the switching transistor 7 and T2 a free oscillation period. The oscillating voltage $V_L$ is detected by the voltage dividing resistor circuit 17 to be supplied to the microcomputer 13 as a synchronous signal S1. Consequently, the switching transistor 7 is controlled so that the time when the switching transistor 7 is controlled so that the time when the switching transistor 7 is initiated to be turned on is synchronized to the time when the oscillating voltage $V_L$ reaches the value V0 corresponding to a zero-cross point t0 of the oscillating current $I_L$. A current transformer 18 is connected across an AC current input line of the bridge-connected diode 2, which input line corresponds to the primary side of the transformer 6. Since an output current of the current transformer 18 is proportional to an anode current of the magnetron 12, the output current of the current transformer 18 is supplied to the microcomputer 13 as a magnetron anode current detection signal S2. Based on the signal S2, the microcomputer 13 controls the switching transistor 7 so that the "on" period of the switching transistor 7 is shortened with increase in an amount of the anode current and lengthened with decrease in the amount of the anode current, thereby maintaining the anode current at a predetermined value.

Figure 3:
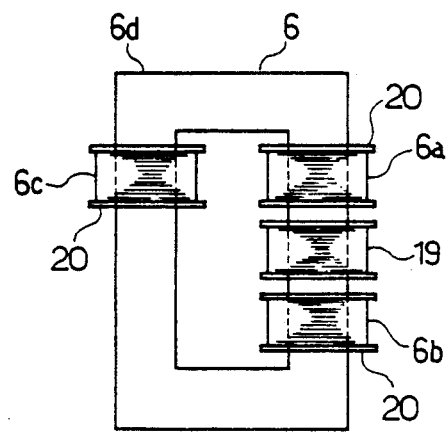
FIG. 3 is a front view of the transformer employed for obtaining a magnetron anode current.

Reference numeral 19 designates a detecting winding provided in the transformer 6. As shown in FIG. 3 in detail, the detecting winding 19 is disposed between the primary winding 6a and secondary winding 6b both wound on the core 6d. The detecting winding 19 is magnetically coupled at one end thereof to the primary winding 6a through the core 6d. All the windings 6a, 6b, 6c and 19 are wound on the core 6d via respective bobbins 20. The detecting winding 19 is grounded at the other end thereof. An output voltage induced by the detecting winding 19 is supplied to the microcomputer 13 of the control circuit 15 through a rectifier circuit 21 and an A/D conversion circuit 22 in turn. Display means 23 comprising an LED serves to give an alarm to a user.

The microcomputer 13 serves as alarm means as well as abnormal condition detecting means for detecting the abnormal condition of the secondary circuit of the transformer 6 and interruption means for interrupting the inverter circuit 5. These functions of the microcomputer 13 will be described with operation of the detecting winding 19 hereafter.

Figure 4:
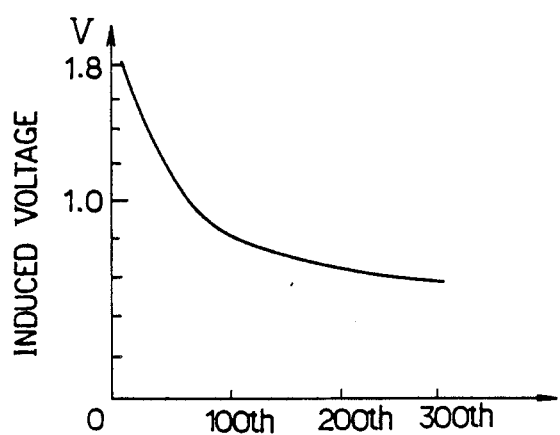
FIG. 4 is a graph showing the relationship between the turn of the transformer secondary winding where a short-circuit has taken place (ordinal number) and the voltage induced by a detecting winding.

In operation of the above-described high frequency heating apparatus, the magnetron 12 generates microwave energy which is at a frequency of approximately 2,450 MHz, the microwave energy being supplied into the cooking chamber. An experiment made by the inventor shows that should the secondary circuit of the transformer 6 be in a normal condition, a voltage of about 1.8 volts is induced by the detecting winding 19. In the case where the transformer secondary circuit is short-circuited or more specifically, a short-circuit takes place between both ends of the secondary winding 6b because of a short-circuit between both output terminals of the secondary winding 6b, a short-circuit between both ends of a series circuit of the diode 10 and capacitor 11, a short-circuit in the magnetron 12 or for other reasons, the voltage induced by the detecting winding 19 is dropped to the value of 0.7 volts as the result of an excessive increase in an amount of magnetic flux induced around the secondary winding 6b. On the other hand, when a closed loop between both output terminals of the secondary winding 6b is opened or the transformer secondary circuit is opened, the amount of magnetic flux induced around the secondary winding 6b is reduced to zero. As a result, the voltage induced by the detecting winding 19 is increased to the value of 2.2 volts. Furthermore, when the short-circuit takes place within the secondary winding 6b, the voltage induced by the detecting winding 19 varies in the range between 0.7 and 1.8 volts in accordance with the turn of the winding where the short-circuit has taken place, as shown in FIG. 4.

The microcomputer 13 is previously provided with a reference value on which it is determined whether or not the secondary winding 6b is in an abnormal condition such as the short-circuit or open-circuit. Based on the comparison of the voltage induced by the detecting winding 19 with the reference value, the microcomputer 13 determines whether or not the secondary winding 6b is in the abnormal condition such as the short-circuit or open-circuit. When determining that the secondary winding 6b is in the abnormal condition, the microcomputer 13 operates to interrupt the switching operation of the switching transistor 7 and to activate the display means 23 to alarm for the abnormal condition. Display modes are changed between the short-circuit and open-circuit conditions.

In accordance with the above-described embodiment, the abnormal condition of the secondary circuit of the transformer 6 such as short-circuit and open-circuit may be detected. Upon detection of the abnormal condition, the switching transistor 7 is deenergized or energization of the magnetron through the inverter circuit 5 is interrupted. Consequently, the high frequency heating apparatus may be prevented from being driven under the abnormal condition of the transformer secondary circuit. Furthermore, since the alarm operation is performed upon detection of the abnormal condition, the user may be promptly informed of occurrence of the abnormal condition.

Furthermore, the detecting winding 19 is arranged between the primary and secondary windings 6a, 6b of the transformer 6 and grounded. Consequently, even if insulation of the secondary winding 6b as a high-voltage winding is deteriorated, the detecting winding 19 having less turns than the secondary winding 6b (one to three turns, for example) causes a short-circuit between both ends of the secondary winding 6b through the earth line. Consequently, the high voltage at the secondary side may be prevented from being applied to the primary winding 6a or commercial power source 21 side.

Although both of the deenergization of the inverter circuit and the alarming operation are performed at the occurrence of the abnormal condition in the foregoing embodiment, either of them may be performed.

The foregoing disclosure and drawings are merely illustrative of the principles of the present invention and are not to be interpreted in a limiting sense. The only limitation is to be determined from the scope of the appended claims.

What I claim is:

1. A high frequency heating apparatus comprising:
    (a) a transformer having primary and secondary windings;
    (b) inverter means comprising an oscillation circuit electrically connected to the primary winding of said transformer and a switching element controlled so as to be turned on and off so that a DC current is intermittently fed to the oscillation circuit for the purpose of inducing a high frequency voltage in the primary winding;
    (c) a magnetron connected to a high frequency rectifying circuit rectifying an AC voltage from the secondary winding of said transformer to a DC voltage, which DC voltage is applied to said magnetron;
    (d) a control circuit for controlling "on" and "off" periods of the switching element so that a magnetron anode current is controlled;
    (e) a detecting winding provided in said transformer so as to be magnetically connected to the primary winding, thereby detecting an induced voltage the value of which indicates either a short-circuit or open-circuit in the secondary circuit of said transformer;
    (f) abnormal condition detecting means for detecting an abnormal condition of the secondary circuit of said transformer based on the voltage induced by said detecting winding; and
    (g) interruption means for interrupting the operation of said switching element when the abnormal condition of the secondary circuit of said transformer is detected by said abnormal condition detecting means.

2. A high frequency heating apparatus according to claim 1, which further comprises alarm means for alarming when the abnormal condition of the secondary circuit of said transformer is detected by said abnormal condition detecting means.

3. A high frequency heating apparatus according to claim 1, wherein said detecting winding is disposed between the primary and secondary windings of said transformer and grounded.

* * * * *